(12) United States Patent
Igarashi et al.

(10) Patent No.: US 9,529,354 B2
(45) Date of Patent: Dec. 27, 2016

(54) MACHINE TOOL

(71) Applicant: Yamazaki Mazak Corporation, Niwa-gun (JP)

(72) Inventors: Jun Igarashi, Niwa-gun (JP); Isao Adachi, Niwa-gun (JP); Makoto Tanahashi, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 14/672,235

(22) Filed: Mar. 30, 2015

(65) Prior Publication Data

US 2015/0205287 A1    Jul. 23, 2015

Related U.S. Application Data

(63) Continuation of application No. PCT/JP2012/075423, filed on Oct. 1, 2012.

(51) Int. Cl.
*G05B 7/02* (2006.01)
*G05B 19/409* (2006.01)
(Continued)

(52) U.S. Cl.
CPC ........... *G05B 19/409* (2013.01); *B23Q 1/0045* (2013.01); *B23Q 11/0891* (2013.01); *G05B 7/02* (2013.01);
(Continued)

(58) Field of Classification Search
CPC .................................................. G05B 19/409
(Continued)

(56) References Cited

U.S. PATENT DOCUMENTS 6,243,619 B1 * 6/2001 Inamasu .............. G05B 19/409
                                                              700/172
7,155,303 B2 * 12/2006 Sagasaki ............ G05B 19/4093
                                                              700/173
(Continued)

FOREIGN PATENT DOCUMENTS

CN          1689754      11/2005
CN        201807944 U     4/2011
(Continued)

OTHER PUBLICATIONS

International Search Report for corresponding International Application No. PCT/JP2012/075423, Dec. 25, 2012.
(Continued)

*Primary Examiner* — Shawki S Ismail
*Assistant Examiner* — Muhammad S Islam
(74) *Attorney, Agent, or Firm* — Mori & Ward, LLP

(57) ABSTRACT

A machine tool includes a tool attachment device, a workpiece attachment device, a controller, a mode selector, an axis selector, a cover, a window, and a manual operation auxiliary display device. The controller is configured to control movements of at least one of the tool attachment device and the workpiece attachment device with respect to a target axis. The mode selector is configured to select a manual operation mode or an automatic operation mode. The axis selector is to select the target axis among a plurality of axes in a case where the mode selector selects the manual operation mode. The manual operation auxiliary display device is configured to display directions of the plurality of axes included in the machine tool as an axis configuration model in the window in a case where the manual operation mode is selected.

18 Claims, 12 Drawing Sheets

(51) Int. Cl.
*B23Q 11/08* (2006.01)
*B23Q 1/00* (2006.01)
*G05D 3/00* (2006.01)

(52) U.S. Cl.
CPC ....... *G05D 3/00* (2013.01); *G05B 2219/33004* (2013.01); *G05B 2219/35472* (2013.01); *G05B 2219/36153* (2013.01)

(58) Field of Classification Search
USPC .................................................. 318/574, 575
See application file for complete search history.

(56) References Cited

U.S. PATENT DOCUMENTS

| | | | |
|---|---|---|---|
| 7,506,423 B2* | 3/2009 | Iwabuchi | B23B 3/065 29/27 C |
| 2002/0004688 A1* | 1/2002 | Kojima | G05B 19/404 700/193 |
| 2005/0237343 A1* | 10/2005 | Kanda | B23Q 11/0891 345/633 |
| 2006/0136088 A1* | 6/2006 | Sato | G05B 19/19 700/159 |
| 2007/0050079 A1* | 3/2007 | Itoh | G05B 19/40938 700/179 |
| 2008/0282854 A1* | 11/2008 | Momoi | B23B 1/00 82/1.11 |
| 2009/0160388 A1* | 6/2009 | Zagromski | B23Q 5/58 318/570 |
| 2010/0063608 A1* | 3/2010 | Miller | G05B 19/414 700/97 |
| 2012/0011972 A1* | 1/2012 | Kijima | B23B 23/005 82/148 |

FOREIGN PATENT DOCUMENTS

| | | |
|---|---|---|
| CN | 202225007 U | 5/2012 |
| JP | 06-170695 | 6/1994 |
| JP | 8-11038 | 1/1996 |
| JP | 08-106317 | 4/1996 |
| JP | 11-156677 | 6/1999 |
| JP | 2001-138094 | 5/2001 |
| JP | 2005-100917 | 4/2005 |
| JP | 2005-305602 | 11/2005 |
| JP | 2011-255472 | 12/2011 |

OTHER PUBLICATIONS

Chinese Office Action for corresponding CN Application No. 201280075700.6, Mar. 3, 2016.
Japanese Office Action for corresponding JP Application No. 2014-539500, Apr. 28, 2015 (w/ English machine translation).

* cited by examiner (OFF POSITION)

(FIRST ON POSITION)

(SECOND ON POSITION)

MACHINE TOOL

CROSS-REFERENCE TO RELATED APPLICATIONS

The present application is a continuation application of International Application No. PCT/JP2012/075423, filed Oct. 1, 2012. The contents of this International Application are incorporated herein by reference in their entirety.

BACKGROUND OF THE INVENTION

Field of the Invention

The present invention relates to a machine tool.

Discussion of the Background

Hitherto, in a machine tool, as illustrated in FIGS. 16A and 16B, a workpiece is machined by a tool attached to a tool spindle (not illustrated) in a machining area 13 that is covered with a splash guard 10 or the like. The splash guard 10 or the like is provided with a window 11 into which a transparent plate 12 is fitted. A worker M is able to monitor the machining area 13 via the window 11. Additionally, an operation panel 14 is rotatably supported in a part of the splash guard 10 close to the window 11 so that the operation panel can be operated by the worker M who monitors via the window 11. The operation panel 14 is capable of being fixed at arbitrary angles within a movable range by the worker M, such as a position where an operation surface 14a of the operation panel 14 faces a front side as illustrated in FIG. 16B, and in a direction in which the operation surface 14a intersects the window 11 as illustrated in FIG. 17B, for example, a position where the operation surface 14a is orthogonal to the front splash guard 10. If the operation panel 14 is rotatably provided in this way, the rotational position of the operation panel 14 can be changed according to a worker's standing position. Therefore, there is an advantage that the operation of the operation panel 14 can be performed without changing the standing position.

Additionally, as illustrated in FIG. 7A, the operation surface 14a of the operation panel 14 is provided with automatic operation mode buttons 15 and manual operation mode buttons 16, and mode selection of an automatic operation mode or a manual operation mode is enabled by operating any one of these buttons.

A tape operation mode button 15a, a memory operation mode button 15b, and a manual data input (MDI) operation mode button 15c are included in the automatic operation mode buttons 15, and manual pulse mode buttons 16a, a jog mode button 16b, a rapid mode button 16c, and an origin return mode button 16d are included in the manual operation mode buttons 16. Moreover, the manual pulse mode buttons 16a include a manual pulse 0.0001 mm mode button 16a(1), a manual pulse 0.001 mm mode button 16a(2), a manual pulse 0.01 mm mode button 16a(3), and a manual pulse 0.1 mm mode button 16a(4) for selecting a movement distance per one pulse of pulses generated from a manual pulse generator. Additionally, as illustrated in FIG. 7A, the operation surface 14a of the operation panel 14 is provided with various axis selection buttons 20 to 29 for manually operating respective axes of the machine tool. If any one of the axis selection buttons is operated, a constituent member of the machine tool can be moved in the direction of an axis corresponding to the axis selection button or can be rotated around the axis. For example, in an example illustrated in FIG. 7A, the axis selection buttons include a +X axis selection button 20, a −X axis selection button 21, a +Y axis selection button 22, a −Y axis selection button 23, a +Z axis selection button 24, a −Z axis selection button 25, a +A axis selection button 26, a −A axis selection button 27, a +C axis selection button 28, and a −C axis selection button 29. The +X axis selection button 20, as illustrated in FIG. 7A, is located on a right side as seen from the front, and the −X axis selection button 21 is located on a left side.

If a manual operation mode, for example, a jog mode is selected and the +X axis selection button 20, or the −X axis selection button 21 is operated, it is possible to move the tool spindle or the table in a plus (+) direction or a minus (−) direction of the X axis.

In Japanese Laid-open Patent Publication No. 11-156677, a machining information projection device provided in a machine tool is proposed. The machining information projection device includes a half mirror, and display means for emitting light to display machining information. The half mirror is provided at a position where a machining area of the machine tool is capable of being monitored and at a position where an image emitted from the display means is reflected on a worker, and further is provided so that a portion of the incident light from the machining area is transmitted therethrough to the worker side. In the machining information projection device, the worker can simultaneously view an image reflected by projecting the machining information emitted from and displayed by the display means onto the half mirror, and an actual image of the machining area that is visible through the half mirror.

SUMMARY OF THE INVENTION

According to one aspect of the present invention, a machine tool includes a tool attachment device, a workpiece attachment device, a controller, a mode selector, an axis selector, a cover, a window, and a manual operation auxiliary display device. A machining tool is to be mounted to the tool attachment device. A workpiece to be machined by the machining tool is to be mounted to the workpiece attachment device. The controller is configured to control movements of at least one of the tool attachment device and the workpiece attachment device with respect to a target axis. The mode selector is configured to select a manual operation mode or an automatic operation mode. The axis selector is to select the target axis among a plurality of axes in a case where the mode selector selects the manual operation mode. The cover is to cover a machining area in which the machining tool is to machine the workpiece. The window is provided in the cover to monitor the machining area through the window. The manual operation auxiliary display device is configured to display directions of the plurality of axes included in the machine tool as an axis configuration model in the window in a case where the manual operation mode is selected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
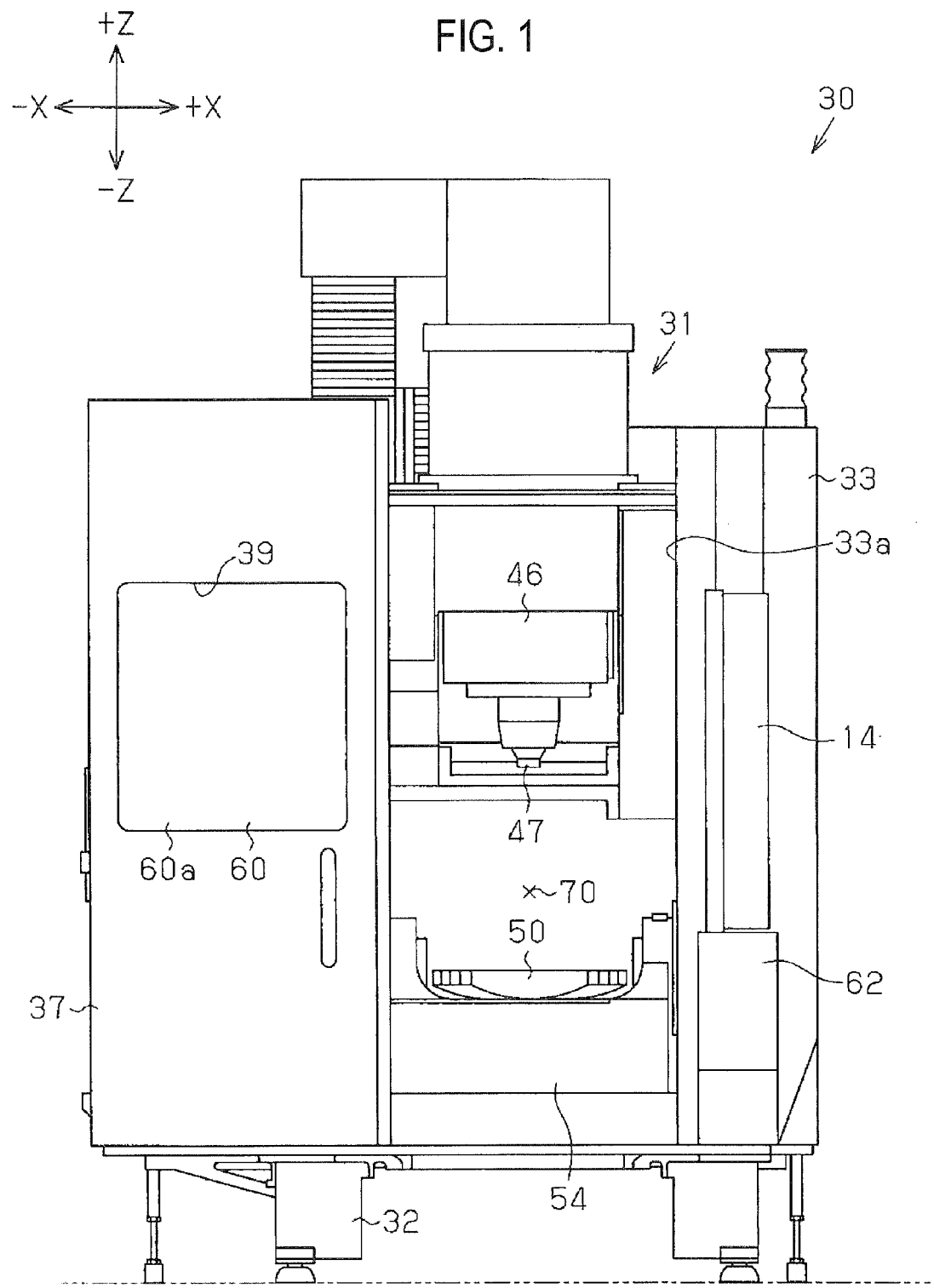
FIG. 1 is a front view of a machine tool in a door open state.

The embodiments will now be described with reference to the accompanying drawings, wherein like reference numerals designate corresponding or identical elements throughout the various drawings.

1. Description of Configuration

Hereinafter, an embodiment of a machine tool in which the present disclosure is embodied will be described with reference to FIGS. 1 to 15.

The machine tool 30 of the present embodiment is a five-axis machine tool, and as illustrated in FIG. 1, includes an apparatus body 31, a splash guard 33 that surrounds the apparatus body 31, and an operation panel 14. In addition, the components of the operation panel 14 that are the same as or equivalent to those described in the aforementioned related-art example are designated by the same reference numerals.

Figure 3:
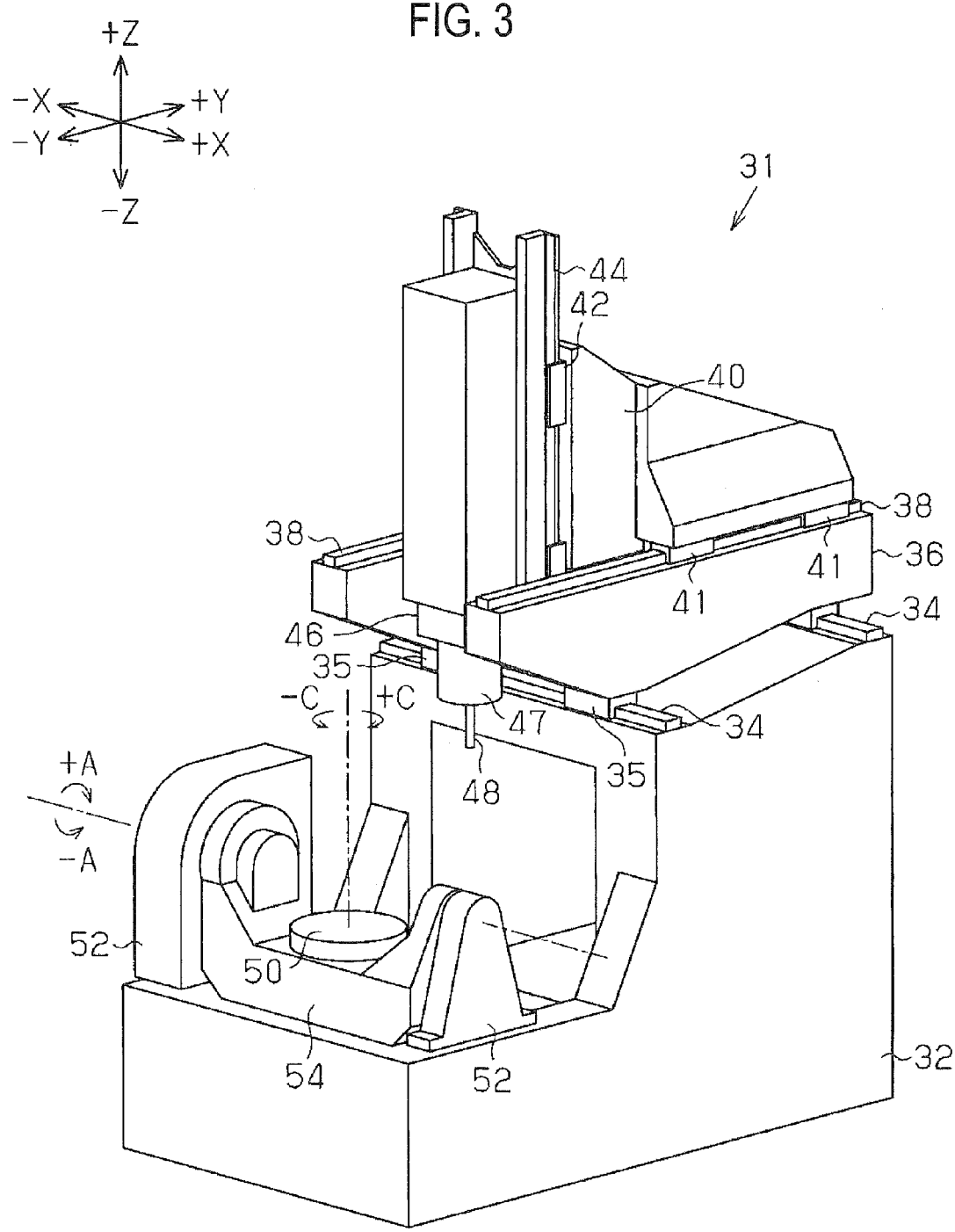
FIG. 3 is perspective view of essential portions of the machine tool.

As illustrated in FIG. 3, a plurality of linear guide rails 34 are respectively provided parallel to each other in an X axis direction, that is, a left-right direction of the machine, on an upper surface of a rear portion of a bed 32 of the apparatus body 31. The linear guide rails 34 are engaged with linear guide blocks 35 provided on a lower surface of a saddle 36, and the saddle 36 is guided by the linear guide rails 34, made movable in the X axis direction. In addition, the lower surface of the saddle 36 is mounted with a ball screw nut (not illustrated), and the ball screw nut is screwed to a ball screw shaft (not illustrated) provided at the bed 32. The saddle 36 is made reciprocally movable in the X axis direction by the ball screw shaft being normally and reversely rotated by an X axis drive motor Mx (illustrated in FIG. 4) that is provided at the bed 32.

A plurality of linear guide rails 38 are respectively provided parallel to each other in a Y axis direction, that is, a front-back direction of the machine, on an upper surface of the saddle 36. The linear guide rails 38 are engaged with linear guide blocks 41 provided on a lower surface of a column 40, and the column 40 is guided by the linear guide rails 38 and is made movable in the Y axis direction. In addition, the lower surface of the column 40 is mounted with a ball screw nut (not illustrated), and the ball screw nut is screwed to a ball screw shaft (not illustrated) that is provided at the saddle 36. The column 40 is made reciprocally movable in the Y axis direction by the ball screw shaft being normally and reversely rotated by a Y axis drive motor My (illustrated in FIG. 4) that is provided at the saddle 36.

A plurality of linear guide blocks 42 are respectively provided parallel to each other in a Z axis direction, that is, an up-down direction of the machine, on the side surfaces of the column 40 on a front side. Linear guide rails 44 are engaged on the linear guide blocks 42. The linear guide rails 44 are provided on a side surface of a tool spindle head 46 on the column side, are guided by the linear guide blocks 42, and are made movable in the Z axis direction. A ball screw nut (not illustrated) is provided on the side surface of the tool spindle head 46 on the column side, and the ball screw nut is screwed to a ball screw shaft (not illustrated) that is provided at the column 40. The tool spindle head 46 is made reciprocally movable in the Z axis direction by the ball screw shaft being normally and reversely rotated by a Z axis drive motor Mz (illustrated in FIG. 4) that is provided at the column 40.

The tool spindle head 46 includes a built-in type tool spindle motor Ms (refer to FIG. 4), and a spindle 47 is made to be capable of being rotatably driven by the tool spindle motor Ms. A machining tool 48 for performing milling is attachable to the spindle 47.

The saddle 36, the column 40, and the tool spindle head 46 are an example of a tool attachment device.

A table 50 formed in the shape of a disk is provided on the bed 32. The table 50 is a tilt type rotary table. A table supporting base 54 is supported in a rotatable manner around an A axis by the supporting member 52 supported on the bed 32, and the table 50 is provided in a rotatable manner around a C axis orthogonal to the A axis on the table supporting base 54. The table supporting base 54 is rotatable in a +A-direction and a −A-direction around the A axis by an A axis drive motor Ma (refer to FIG. 4), provided at the supporting member 52, being normally and reversely rotated. The table 50 is rotatable in a +C-direction and a −C-direction around the C axis by a C axis drive motor Mc (refer to FIG. 4), provided at the table supporting base 54, being normally and reversely rotated.

A space where the machining tool 48 machines a workpiece through the respective operations of the saddle 36, the column 40, and the tool spindle head 46 that are the tool attachment device is referred to as a machining area 70. Additionally, the supporting member 52, the table supporting base 54, and the table 50 are an example of the workpiece attachment device.

Figure 2:
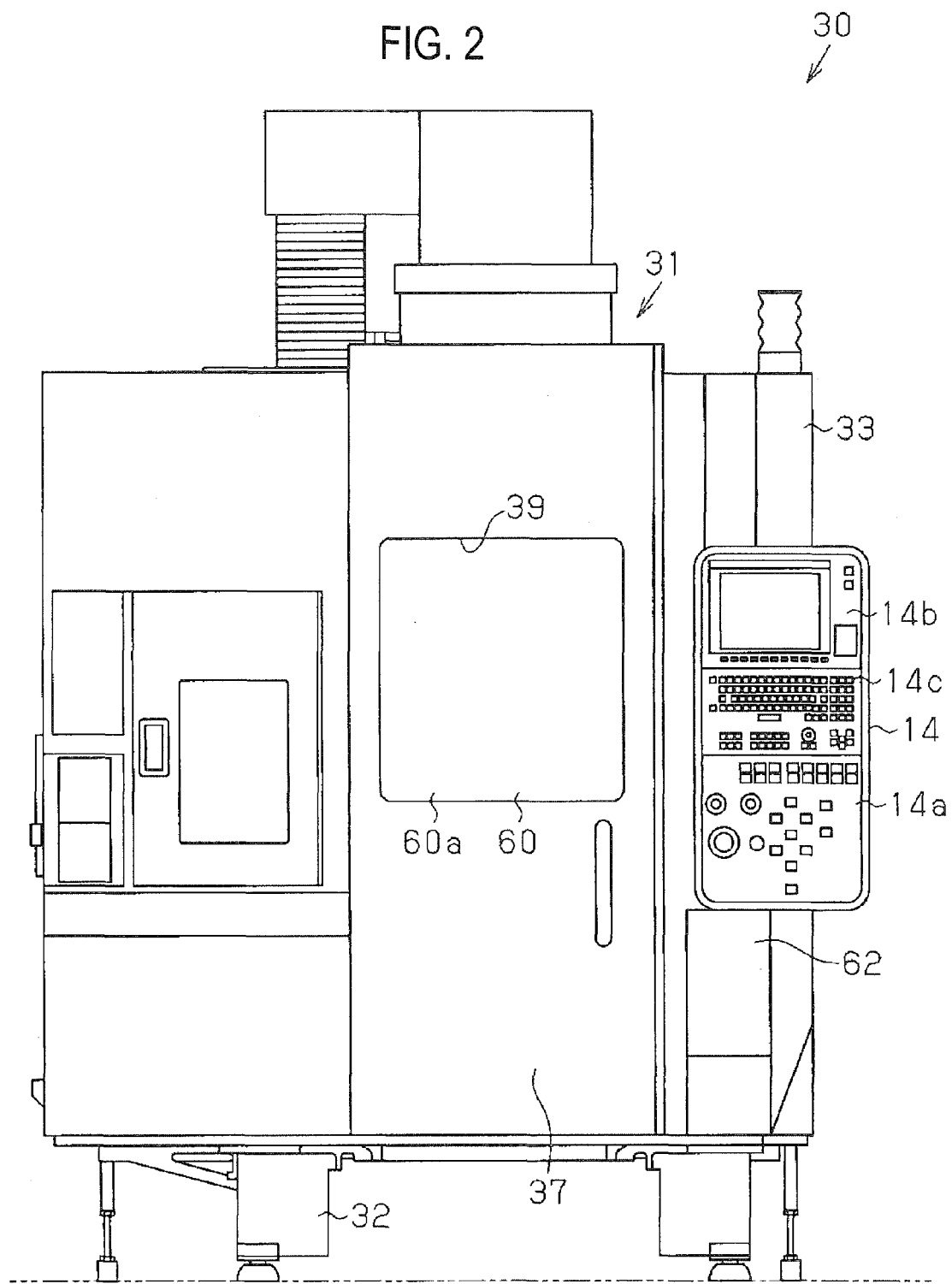
FIG. 2 is a front view of the machine tool in a door closed state.

As illustrated in FIG. 1, the splash guard 33 provided on the front side of the apparatus body 31 is provided with an opening 33a, and a door 37, which opens and closes the opening 33a, is provided in an openable and closable manner at the splash guard. That is, the door 37 is provided so as to be slidable in a lateral direction between a closed position where the opening 33a illustrated in FIG. 2 is closed and an open position illustrated in FIG. 1. If the door 37 is opened, a worker can gain access to the machining area 70 via the opening 33a.

The splash guard 33 provided on the front side of the apparatus body 31 has functions of splash prevention and collection of chips or coolant generated in the machining area 70.

The door 37 is provided with a window 39. The window 39 is fitted by a transmissive display device 60. A transmissive liquid crystal panel or a transmissive organic EL panel is used as the transmissive display device 60. The transmissive display device 60 is a hardware example of the manual operation auxiliary display unit.

Figure 5:
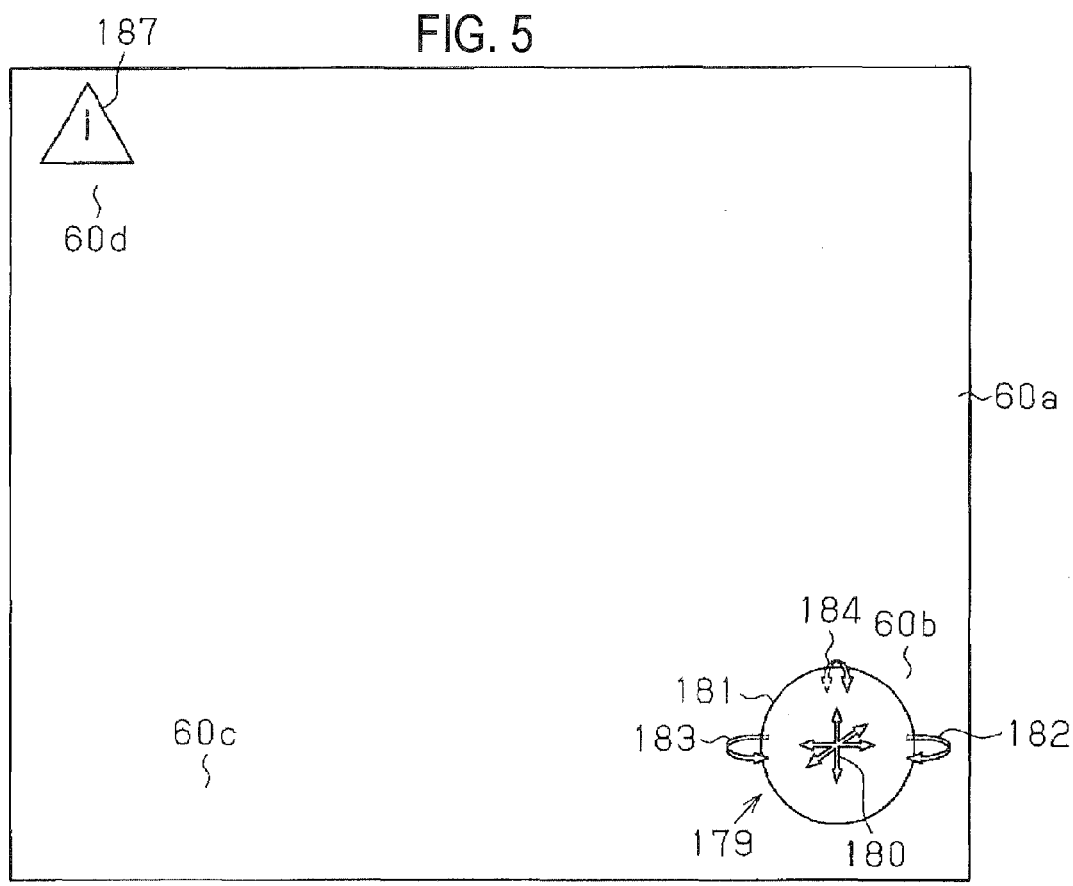
FIG. 5 is a front view of a manual operation auxiliary display unit that is provided at a window.

The transmissive display device 60 is a flat display that has a transparent display surface 60a so that the machining area 70 can be seen through. Additionally, as illustrated in FIG. 5, the display surface 60a is formed in a quadrangular planar shape in the present embodiment, and has display areas 60b, 60c, and 60d where information, including characters, images, or moving images, is displayed, at its periphery and corners.

The worker can monitor the machining of a workpiece in the machining area 70, the operation of the machining tool 48, or the like via the transmissive display device 60 of the window 39.

A method for displaying various kinds of information in the transmissive display device 60 will be described below.

As illustrated in FIGS. 1 and 2, the operation panel 14 is rotatably supported via a bracket 62 so as to be adjacent to the opening 33a with respect to the splash guard 33 provided on the front side. The operation panel 14 includes an operation surface 14a, a display 14b made of a liquid crystal display or the like, and an input key group 14c.

Figure 7A:
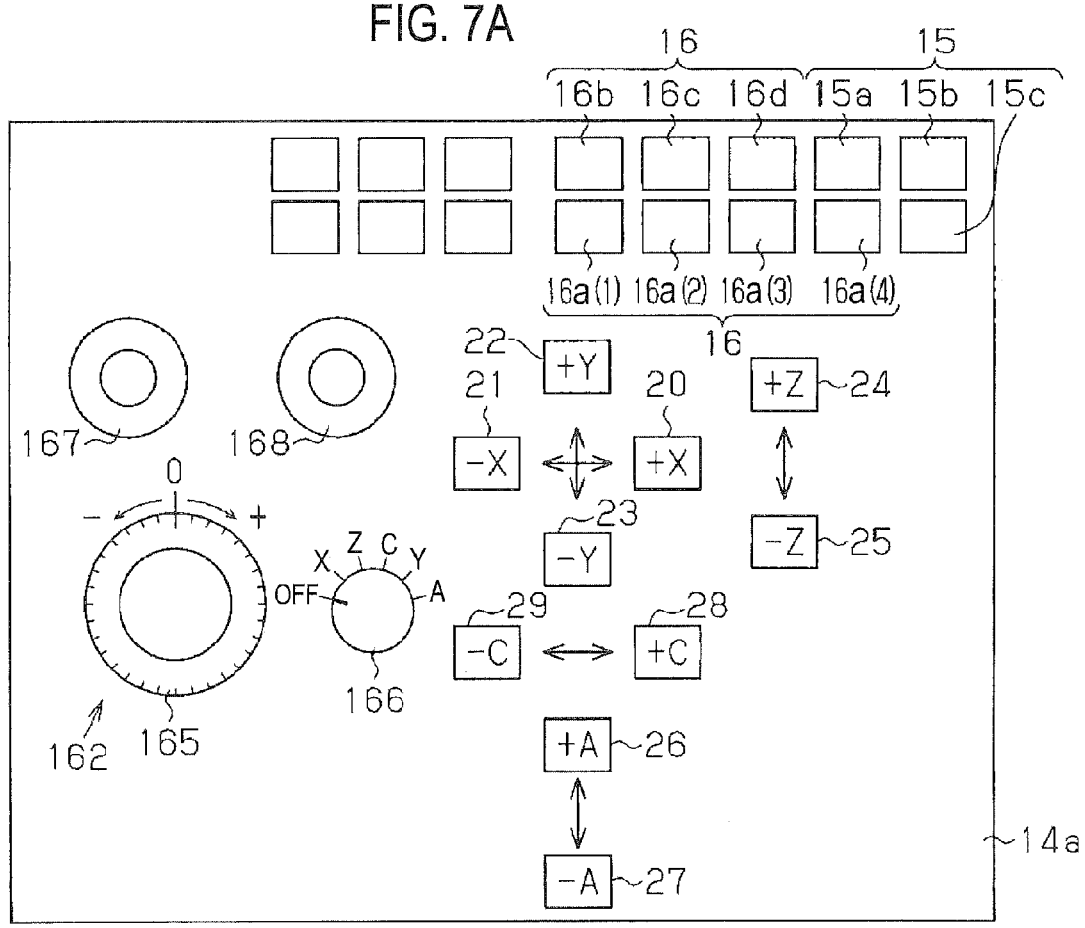
FIG. 7A is a front view of an operation surface of an operation panel.
Figure 9A:
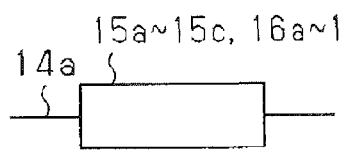
FIG. 9A is an explanatory view of the position of axis selection buttons in an OFF state.
Figure 9B:
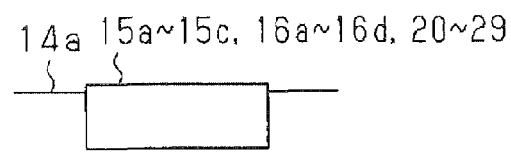
FIG. 9B is an explanatory view of the position of the axis selection buttons in an ON state.

As illustrated in FIG. 7A, the operation surface 14a is provided with automatic operation mode buttons 15 of a tape operation mode button 15a, a memory operation mode button 15b, and an MDI operation mode button 15c, manual operation mode buttons 16 of manual pulse mode buttons 16a, a jog mode button 16b, a rapid mode button 16c, an origin return mode button 16d, and various axis selection buttons 20 to 29 to be used in manual operation modes. The buttons 15a to 15c, 16a to 16d, and 20 to 29 are self-return type pushbutton switches, and are binary switches that generate binary signals of an ON signal at an ON position where the buttons are pushed into the operation panel from the operation surface 14a as illustrated in FIG. 9B and an OFF signal at an OFF position where the buttons protrude further toward the outside of the operation panel than the ON position as illustrated in FIG. 9A.

Each of the axis selection buttons 20 to 29 specifies an axis to be operated in the manual operation modes, and outputs a command to perform the axial movement. By pushing one of the axis selection buttons 20 to 29 when the jog mode, the rapid mode, or the origin return mode is selected, the axial movement can be performed to the corresponding axis.

The operation surface 14a is provided with a handle 165 of a manual pulse generator 162, an axis selection dial 166, a rapid feed rate adjustment switch 167, and a jog feed rate adjustment switch 168.

The handle 165 of the manual pulse generator 162 is a dial type handle for generating the movement distance of an axis. One pulse can be generated by rotating the dial type handle by one graduation. By rotating the dial type handle in left-right opposite directions, a pulse train of which the signs are inverted can be generated, and axes can be moved in a plus (+) direction or a minus (−) direction. The manual pulse generator 162 is an example of an axial movement command signal generator, and the pulse is an example of an axial movement command signal.

The axis selection dial 166 is a dial type switch for selecting a target axis of which the axial movement is performed in a manual pulse mode. Specifically, OFF, X, Z, C, Y, and A are marked at every predetermined angle on the operation surface 14a, and a target axis of which the axial movement is performed in a manual pulse mode is selected by matching a pointer on the dial 166 with any one of positions where X, Z, C, Y, and A are marked.

The rapid feed rate adjustment switch 167, which is a dial type switch, is provided for selecting a rapid feed override by which a rapid feed rate is multiplied, that is, a multiplying factor, when the axis selection buttons 20 to 29 are ON-operated in the rapid mode and the origin return mode or at the time of a positioning operation (G00) to be executed in the automatic operation modes.

The jog feed rate adjustment switch 168, which is a dial type switch, is provided for selecting a jog feed rate in the case that the axis selection buttons 20 to 29 are ON-operated in a jog mode or for selecting a cutting feed override by which a cutting feed rate that is commanded in a machining program in the automatic operation modes is multiplied.

The automatic operation mode buttons 15 are buttons for changing the machine tool 30 into the various automatic operation modes when being ON-operated. There are a tape operation mode in which operations are done according to a machining program from the outside via an input interface (not illustrated), a memory operation mode in which operations are done according to a machining program stored in a machining program memory 120 of a CNC control device 100 to be described below, and a manual data input (MDI) operation mode in which a worker inputs a single execution code on the spot from the operation panel and the operation is done according to the input code, but the description thereof will be omitted herein.

The manual pulse mode buttons 16a are mode selection buttons for setting manual pulse modes. There are four manual pulse mode buttons 16a, and the respective mode buttons are provided in order to select a movement distance per one pulse of pulses generated by the manual pulse generator 162 from four types of 0.0001 mm, 0.001 mm, 0.01 mm, and 0.1 mm.

The jog mode button 16b is a mode selection button that selects a jog feed mode in which an axial movement at a jog feed is performed using the axis selection buttons 20 to 29. A movement speed is based on the selection of the jog feed rate adjustment switch 168.

The rapid mode button 16c is a mode selection button that selects a rapid feed mode in which an axial movement at a rapid feed is performed using the axis selection buttons 20 to 29. A movement speed is based on the selection of the rapid feed rate adjustment switch 167.

The origin return mode button 16d is a mode selection button selects an origin return mode in which an axial movement to the origin position of an axis using the axis selection buttons 20 to 29. A movement speed is based on the selection of the rapid feed rate adjustment switch 167.

Additionally, the input key group 14c provided at the operation surface 14a includes various keys, such as a keyboard for data input, and ten keys, and function keys.

The automatic operation mode buttons 15 and the manual operation mode buttons 16 are an example of a mode selecting unit. The axis selection buttons 20 to 29 and the axis selection dial 166 are examples of axis selection switches.

The door 37 and the splash guard 33 that are located on the front side of the apparatus body 31 are an example of a cover portion.

Figure 4:
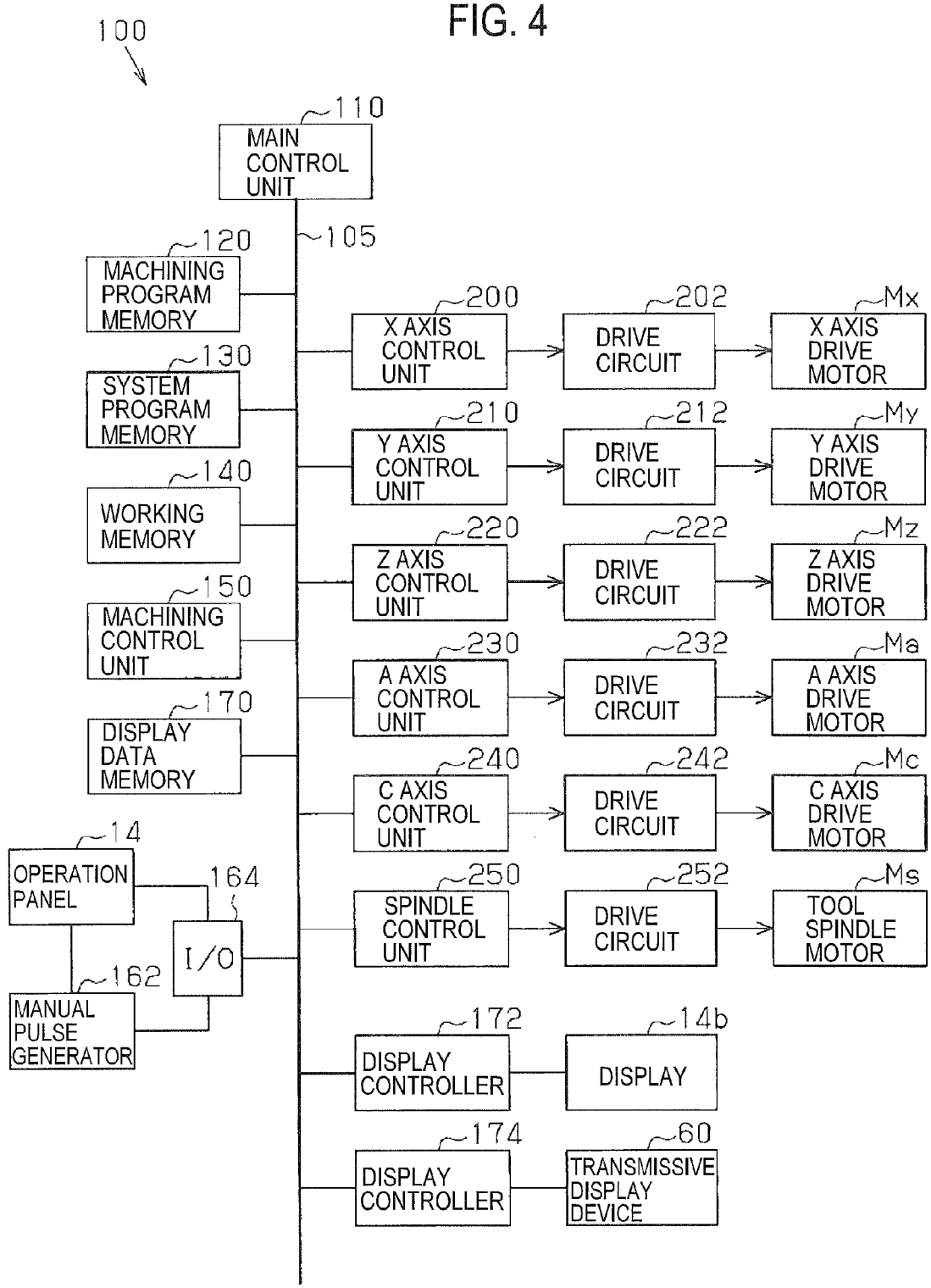
FIG. 4 is a block diagram of a control device of the machine tool.

The machine tool 30 is provided with the CNC control device 100 illustrated in FIG. 4. The CNC control device 100 has a main control unit 110 made of a CPU. A machining program memory 120 in which a machining program is stored, a system program memory 130 in which a program for an overall system is stored, a working memory 140, a machining control unit 150, a display data memory 170, a display controller 172 that performs the display control of the display 14b, a display controller 174 that performs the display control of the transmissive display device 60, an interface 164 electrically connected to the operation panel 14 and the manual pulse generator 162, and the like are connected to the main control unit 110 via a bus line 105.

The various signals generated by the operations of the various buttons and switches provided on the operation surface 14a of the operation panel 14 are input to the main control unit 110 via the interface 164. Additionally, the pulse signal generated by the manual pulse generator 162 is also input to the main control unit 110 via the interface 164.

Various kinds of display data for displaying on the display 14b and the transmissive display device 60, respectively, are stored in the display data memory 170. Symbols for indicating the directions of axes, various kinds of warning display data, various kinds of prohibition display data, display data showing the state of the current machine tool, display data that prompts a worker to perform various kinds of operations, and the like are included in the display data for displaying on the transmissive display device 60.

Since the display controller 172 performs the display control of the display 14b of the operation panel 14, and is widely known for NC machine tools, the detailed description thereof will be omitted.

The display controller 174 performs the display control of the transmissive display device 60 to display the various kinds of display data stored in the display data memory 170 on the display areas when the machine tool is operated in the manual operation modes.

Additionally, an X axis control unit 200, a Y axis control unit 210, a Z axis control unit 220, an A axis control unit 230, a C axis control unit 240, and a spindle control unit 250 are connected to the main control unit 110 via the bus line 105. The respective axis control units receive movement commands for respective axes (five axes) from the main control unit 110 and outputs the movement commands of the respective axes to drive circuits 202, 212, 222, 232, 242, and 252. The respective drive circuits receive the movement commands, and drive the motors Mx, My, Mz, Ma, Mc, and Ms for the respective axes (X, Y, Z, A, C, and tool spindle). The main control unit 110 is an example of a control unit that performs axial movements.

2. Working and Effects of Embodiment

Next, the working of the machine tool 30 configured as described above will be described.

(General Working in Case of Selecting Manual Operation Mode)

Working common to the respective modes when mode change to one mode of the manual operation modes is performed will be described.

If a worker M ON-operates any of the manual operation mode buttons of a manual pulse 0.0001 mm mode button 16a(1), a manual pulse 0.001 mm mode button 16a(2), a manual pulse 0.01 mm mode button 16a(3), a manual pulse 0.1 mm mode button 16a(4), the jog mode button 16b, the rapid mode button 16c, and the origin return mode button 16d illustrated in FIG. 7A, an ON signal of the selected manual operation mode button is input to the main control unit 110 via the interface 164 illustrated in FIG. 4. By means of the input of the ON signal, the main control unit 110 is switched to the selected manual operation mode, and transmits the ON signal to the display controller 174.

Figure 6:
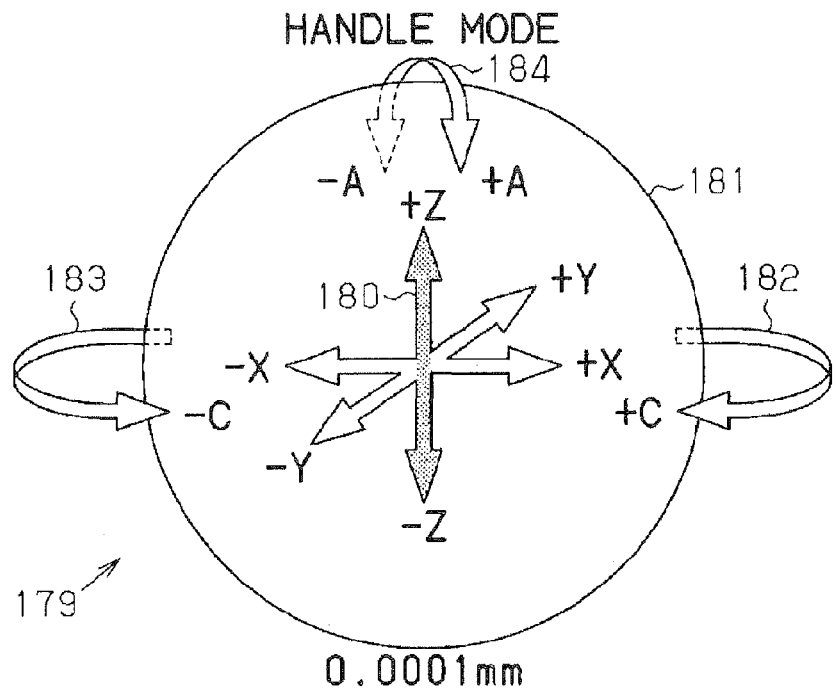
FIG. 6 is an explanatory view of a display aspect illustrating directions of axes.

By means of the input of the ON signal, the display controller 174 reads axis configuration display data, which is data for display of an axis configuration model 179 showing the directions of the axes of the machine tool, from the display data memory 170, and as illustrated in FIG. 5, displays the axis configuration display data on the display area 60b at a corner in the display surface 60a of the transmissive display device 60. The axis configuration model 179, as illustrated in FIG. 6, includes a symbol 180 for a rectangular coordinates axis in which respective plus (+) directions and minus (−) directions of the X axis, the Y axis, and the Z axis are arrowed, a sphere 181 at the center of which the symbol 180 is arranged, arrows 182 and 183 indicating the movement direction of the C axis around the sphere 181, and an arrow 184 indicating the movement direction of the A axis. Additionally, as illustrated in FIG. 6, in the axis configuration model 179, axis names and directions, that is, +X, −X, +Y, −Y, +Z, −Z, +A, −A, +C, and −C are attached to the respective axes.

Additionally, although illustration is omitted for convenience of explanation in FIG. 5, as illustrated in FIG. 6, the display controller 174 performs the display of "HANDLE MODE", "JOG MODE", "RAPID MODE", or "ORIGIN RETURN MODE" according to the ON signal, that is, the ON signal in the selected manual operation mode, in order to show the manual operation mode in an upper area of the axis configuration model 179. Namely, the display of "HANDLE MODE" is performed in the ON operation of the buttons 16a(1) to 16a(4), the display of "JOG MODE" is performed in the ON operation of the button 16b, the display of the "RAPID MODE" is performed by the ON operation of the button 16c, and the display of the "ORIGIN RETURN MODE" is performed in the ON operation of the button 16d.

Additionally, the movement distance per one pulse in the case of a manual pulse mode, the jog feed rate selected by the jog feed rate adjustment switch 168 in the case of the jog mode, and a rapid feed override value selected by the rapid feed rate adjustment switch 167 in the case of the rapid mode and the origin return mode are respectively displayed based on an input manual operation mode signal in a lower display area of the axis configuration model 179. A signal selected by the jog feed rate adjustment switch 168 and a signal selected by the rapid feed rate adjustment switch 167 are given when the main control unit 110 transmits signals, which have been input from the operation panel 14 via the interface 164 to the main control unit 110, to the display controller 174.

Figure 17A:
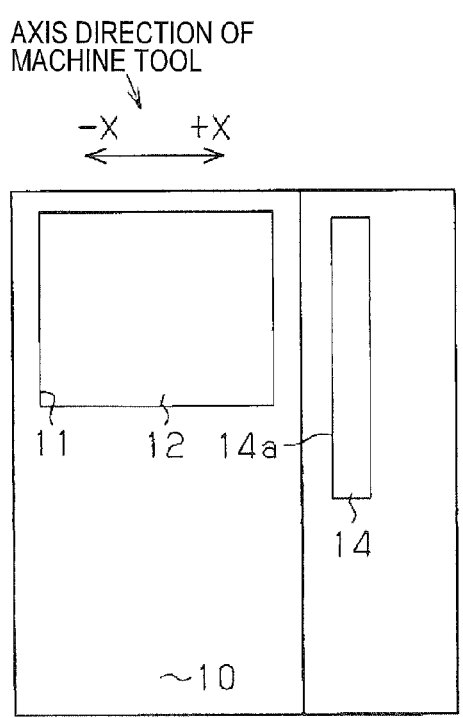
FIG. 17A is a front view around the window of the machine tool when the operation surface of the operation panel is directed perpendicularly to the window.
Figure 17B:
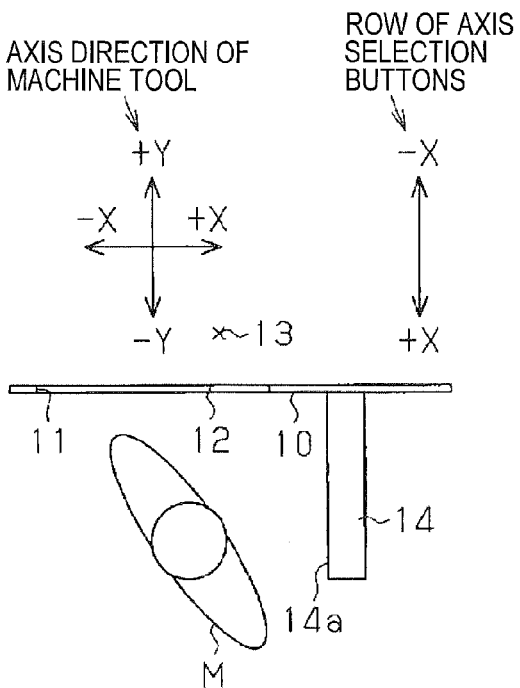
FIG. 17B is a schematic plan view around the window of the machine tool when the operation surface of the operation panel is directed perpendicularly to the window.

From the above working, the configuration of the axes included in the machine tool is displayed on the window 39 if selecting a manual operation mode is performed. Thus, since a worker can confirm which axis is an axis of which an axial movement is going to be performed in which direction, by comparing the posture of an actual machine or workpiece to the configuration of the axes, the direction of the axis can be determined without mistake. For example, even when the worker M stands at the positions illustrated in FIGS. 17A and 17B and rows of axis selection buttons on operation panels do not coincide with the directions of the axes of the machine tool, the worker M confirms the axis names and directions in the axis configuration model 179 displayed on the window. Thus, there is no uneasy feeling when operation is performed, and the possibility of erroneous operation also becomes extremely low.

Since the operation of an axis selection button can be correctly and quickly performed, the machining time of a first article in which manual intervention is frequently performed can be shortened. Moreover, it is possible to greatly contribute to beginners' operation education or assistance for machine tools with a complicated axis configuration.

(In Case of Manual Operation Mode where Operation is Performed to Simultaneously Output Axis Selection Signal and Movement Command Signal)

Figure 11A:
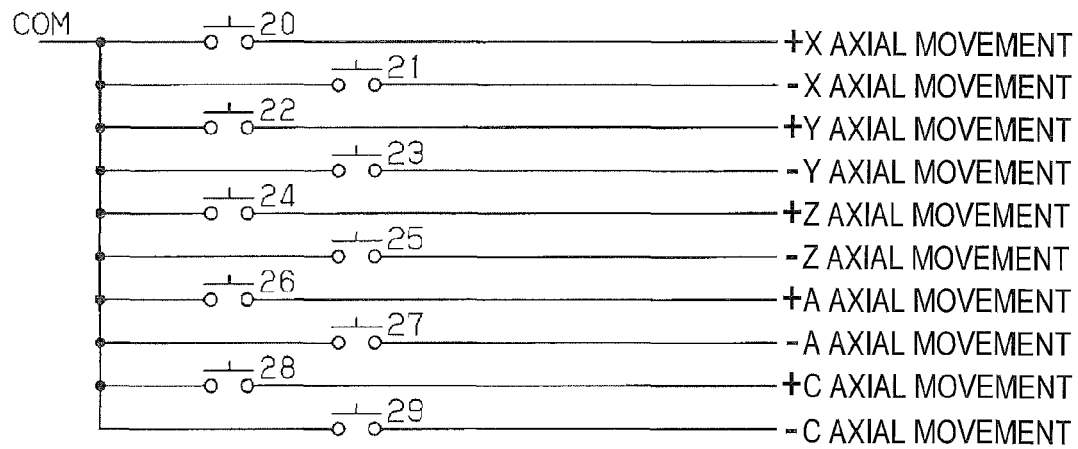
FIG. 11A is an interface circuit diagram illustrating that axial movements are operated with axis selection buttons of an example.

The axis selection buttons 20 to 29 illustrated in FIG. 7A are switches that perform an axial movement in the jog mode, the rapid mode, and the origin return mode. An example of an interface circuit is illustrated in FIG. 11A. An axial movement is performed by signals +X, −X, +Y, −Y, +Z, −Z, +A, −A, +C, and −C that are output from the axis selection buttons 20 to 29.

Figure 8:
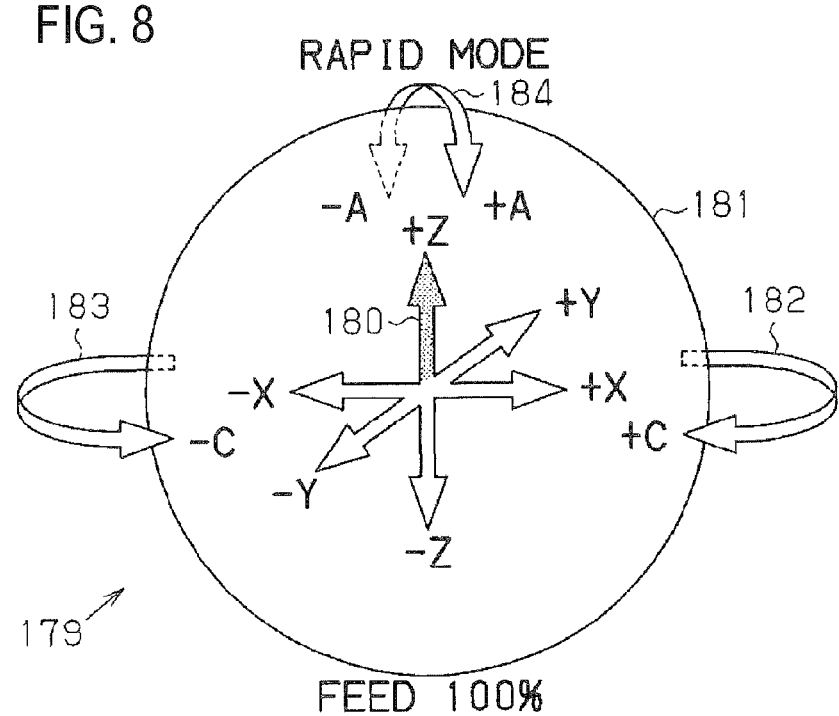
FIG. 8 is an explanatory view of a display aspect illustrating directions of axes.

The main control unit 110 specifies an axis and a direction that are specified on the basis of a signal from an axis selection button and outputs the specified result to the display controller 174, if any one of the axis selection buttons 20 to 29 operated by the worker M is operated to the ON position illustrated in FIG. 9B. The display controller 174 highlights an arrow for the direction of the specified axis, that is, a movement direction of the axis. When the arrow for the direction of the axis is highlighted, a half indicating the specified direction for the arrow of the specified axis is highlighted. An example of display when a +Z axis selection button 24 is pushed in the rapid mode is illustrated in FIG. 8. When directions are expressed by two arrows like arrows 182 and 183 indicating the directions of the C axis, any one arrow indicating a specified direction is highlighted. Although the method of the highlighting is not limited, for example, a portion that is not highlighted is displayed with an inconspicuous color, whereas a portion to be highlighted is displayed with a conspicuous color. Otherwise, the portion to be highlighted is displayed by blinking, and the portion that is not highlighted is displayed by light reduction. Otherwise, the portion to be highlighted is displayed with a high degree of brightness, and the portion that is not highlighted is displayed with a low degree of brightness.

After the worker keeps pushing an operated axis selection button for a predetermined time, the main control unit 110 controls axial movement of an axis specified by the axis selection button, at a jog feed rate selected by the jog feed rate adjustment switch 168 or with a multiplying factor selected by the rapid feed rate adjustment switch 167, that is, a rapid feed override. In addition, since the details of control in the jog mode, the rapid mode, or the origin return mode are widely known, the description of the control will be omitted.

The machine tool configured as described above includes the transmissive display device 60 that highlights the movement directions of the axes specified by the operated axis selection buttons 20 to 29 on the window 39. Keeping pushing the axis selection buttons 20 to 29 makes first the specified movement direction of the axis be highlighted, and makes axis movement start after a predetermined time. In addition, the predetermined time is a time based on a value that is input to and stored in a memory in advance, and is changeable.

According to this configuration, the worker is able to acquire information on the movement directions of the axis selection buttons 20 to 29 without changing the direction of his/her eyes, and even if the buttons are erroneously operated, the worker can be aware of the erroneous operation and stop the operation before axial movement is actually performed.

Figure 10A:
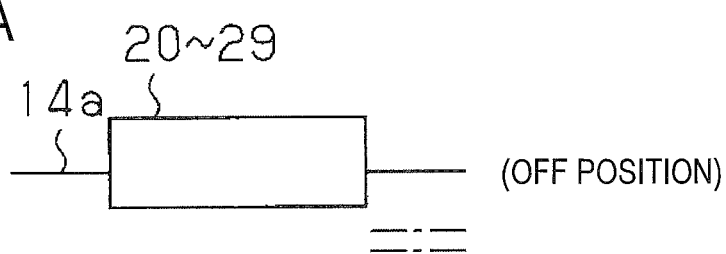
FIG. 10A is an explanatory view of the position of axis selection buttons in an OFF state in another embodiment.
Figure 10B:
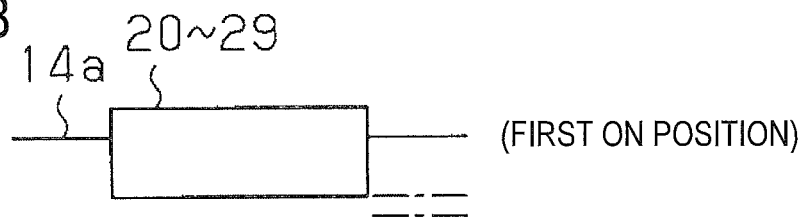
FIG. 10B is an explanatory view of the position of the axis selection buttons in an ON state at a shallow operation position.
Figure 10C:
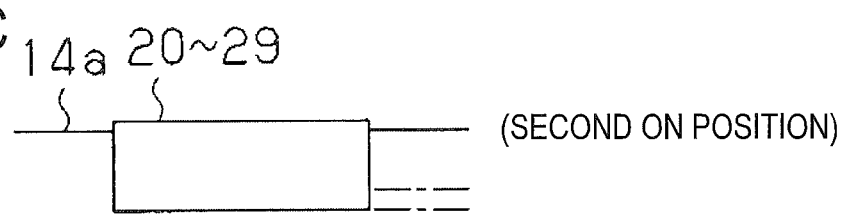
FIG. 10C is an explanatory view of the position of the axis selection buttons in an ON state at a deep operation position.

In the above embodiment, the axis selection buttons 20 to 29 are the binary switches. However, as illustrated in FIGS. 10A to 10O, in the configuration of the embodiment, self-return type ternary switches may be used instead of the binary switches. The ternary switches are capable of taking three positions of an OFF position, a first ON position where an operation position is at a height lower than an OFF position, that is, a shallow operation position, and a second ON position where the operation position is at a height still lower than the first ON position, that is, a deep operation position. When any one of the axis selection buttons 20 to 29 is operated to the first ON position, the display controller 174 highlights an arrow indicating an axial movement direction of an axis specified by the operated button of the axis selection buttons 20 to 29, on the basis of an ON signal generated at the first ON position.

Additionally, when any one of the axis selection buttons 20 to 29 is operated to the second ON position, the main control unit 110 operates a drive motor for an axis selected by the operated button of the axis selection buttons 20 to 29 and starts axis operation, on the basis of an ON signal generated at the second ON position by the operated button of the axis selection buttons 20 to 29.

If such a configuration is adopted, the movement directions of the axes can be highlighted and the worker can intentionally adjust the delay time of actual axial movement depending on the intensity of pushing forces with which the axis selection buttons 20 to 29 are operated, in the jog mode, the rapid mode, or the origin return mode. For this reason, a worker who is not yet experienced in machine operation can strongly push an axis selection button to perform an axial movement after the worker first pushes the button lightly and confirms the movement direction of the axis, and can safely and comfortably perform an axial movement operation. Meanwhile, a worker experienced in the operation of the machine can strongly push an axis selection button from the start, thereby quickly performing axial movement.

(In Case of Manual Operation Mode Including Axial Movement Command Signal Generator)

Figure 11B:
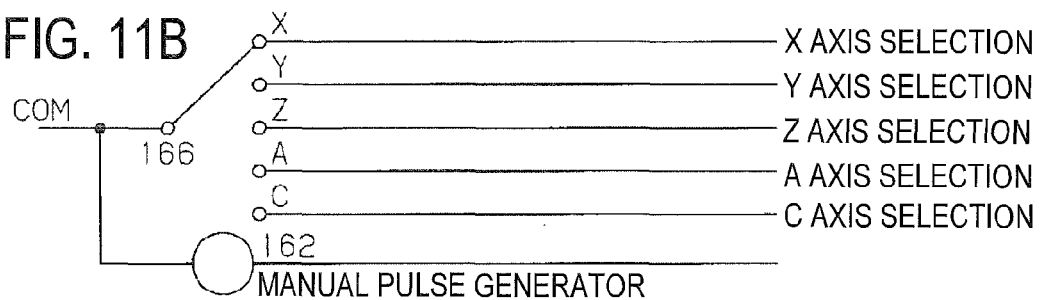
FIG. 11B is an interface circuit diagram illustrating that axial movements are operated with an axis selection dial and a manual pulse generator of the example.

The manual pulse generator 162 illustrated in FIG. 7A is an axial movement command signal generator. In this example, the manual pulse generator 162 is operated in a manual pulse mode to perform an axial movement. A target axis of which an axial movement is performed is selected by the axis selection dial 166 that is an axis selection switch. An example of an interface circuit is illustrated in FIG. 11B.

When a manual pulse mode is selected, an axis selected by the axis selection dial 166 in the axis configuration model 179 is highlighted. Specifically, the main control unit 110 specifies an axis selected by the axis selection dial 166 on the basis of the signal from the axis selection dial 166, and outputs the specified result to the display controller 174. The display controller 174 highlights the axis selected by the axis selection dial 166. Since the highlighting method is the same as that of the jog mode or the like except for a portion to be highlighted that will be described below, the description thereof will be omitted.

With respect to the portion to be highlighted, in the jog mode or the like, the arrow of the direction of the axis selected as illustrated in FIG. 8, that is, an arrow of a specific direction of a specific axis is highlighted. However, in this mode, the overall arrow of the axis selected as illustrated in FIG. 6, that is, both the plus (+) direction and the minus (−) direction of the selected axis are highlighted.

Since the axial movement in the manual pulse modes is widely known, the description thereof will be omitted.

Figure 7B:
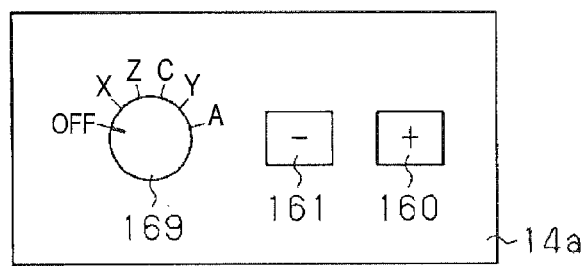
FIG. 7B is a front view of part of an operation surface in another embodiment.
Figure 11C:
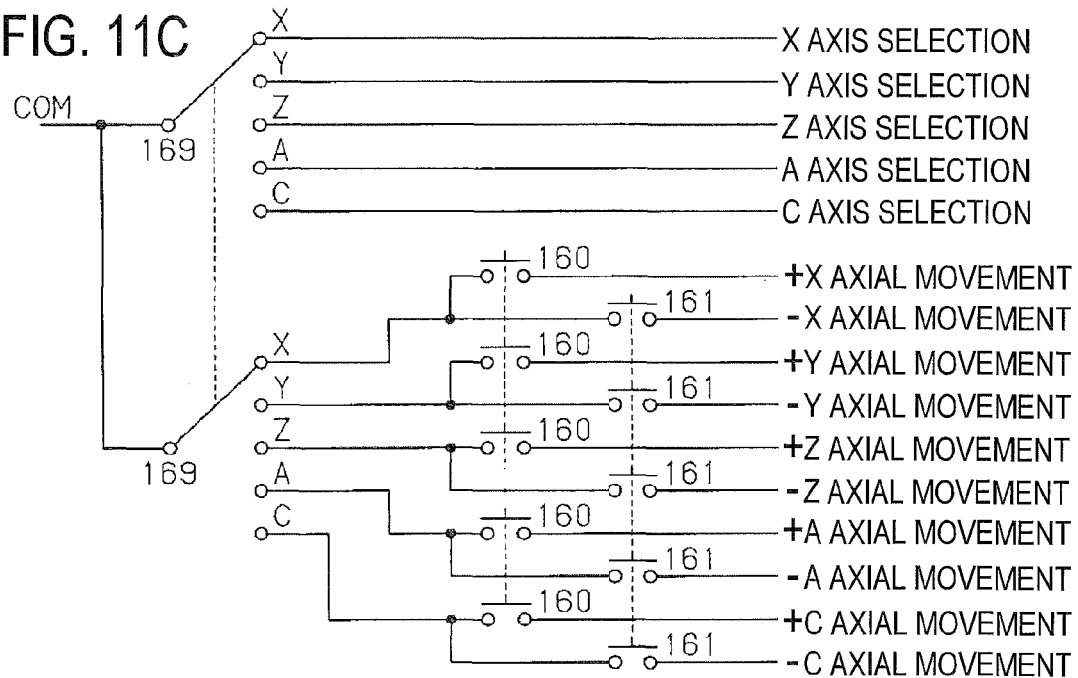
FIG. 11C is an interface circuit diagram illustrating axial movements are operated with axis selection dials and axial buttons of another example.

In addition, the same axis selection dial 169 as that in the manual pulse modes as illustrated in FIG. 7B may be included as an axis selection switch in the jog mode, the rapid mode, and the origin return mode, and a plus (+) direction button 160 and a minus (−) direction button 161 are included as axial movement command signal generators so that an axial movement can be performed by pushing a button of a plus (+) direction or a minus (−) direction after selecting each axis in a manual operation mode. By adopting such a configuration, an axis selected by the axis selection switch can be highlighted while any mode of the jog mode, the rapid mode, and the origin return mode is selected. An example of an interface circuit in this case is illustrated in FIG. 11C.

As a result, in a manual operation mode where an axis to be operated is selected by the axis selection switch and axial movement is operated by an axial movement command signal generator, an axis selected by the axis selection switch is highlighted on the window. Therefore, a worker can confirm whether or not the axis selected by the axis selection switch is an axis intended by the worker before the axial movement is operated.

(Prohibition Display and Warning Display)

In the present embodiment, the main control unit 110 performs prohibition display or warning display when there is a certain hindrance as follows in the manual pulse modes and the other manual operation modes.

Prohibition Display

Figure 12:
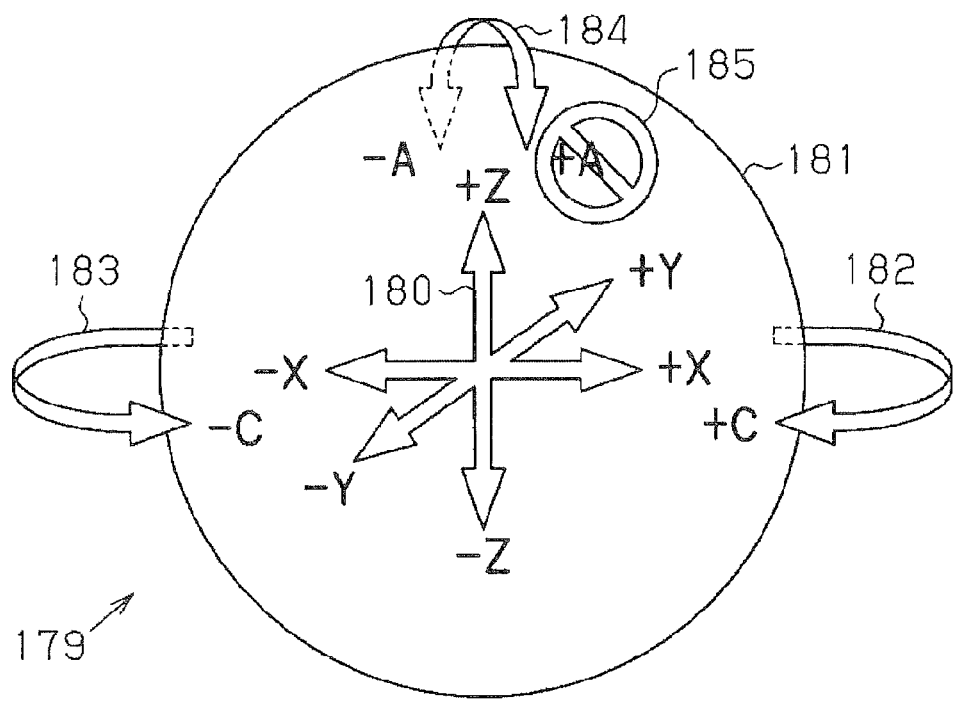
FIG. 12 is an explanatory view of a display aspect illustrating axis to which the axial movement prohibition is applied by means of the interlock function.

Generally, a mechanical origin is set to stroke ends in plus (+) directions in the case of X, Y, and Z axes that are linear axes, and minus (−) area of the respective axes also serve as machining areas. That is, movement in the plus (+) directions from an origin position of the respective linear axes is prohibited, and interlock for axial movement prohibition is applied. Additionally, even in rotational axes, stroke ends in plus (+) directions and minus (−) directions are set, and interlock for axial movement prohibition is applied to outward directions from the stroke ends. In order for a worker to easily understand that interlock for axial movement prohibition to the outside of the stroke end is applied in the manual operation modes when each axis is located at its stroke end, the display controller 174 reads prohibition display symbolic data from a display data memory 170, and as illustrated in FIG. 12, displays a prohibition display symbol 185 representing prohibition in the vicinity of an arrow head portion indicating an axial movement direction. That is, the display controller displays an axial movement prohibition state regarding the direction of an axis to which interlock is applied. The example of FIG. 12 is an example in which the prohibition display symbol 185 is displayed in the vicinity of +A because the prohibition display symbol is located at a stroke end of the A axis in a plus (+) direction and axial movement cannot be made any more in the plus (+) direction regarding the A axis.

In addition, although a mechanical origin has been described as the stroke end for convenience of description, the stroke end is not limited to the mechanical origin. It is needless to say that, even when a point other than the mechanical origin is used as the stroke end, axial movement is prohibited and axial movement prohibition is displayed with respect to a direction out of an effective stroke at the stroke end.

Additionally, in the case of a machine tool in which automatic tool exchange (ATC) is executed out of a machining area, the machine tool is configured so that the movement of any one axis of the X axis, the Y axis, and the Z axis to an ATC position is allowed only when the ATC is executed. Generally, an ATC cover is provided so that cutting chips or a coolant is not splashed out of the machining area. An ATC standby position of any one axis of the X axis, the Y axis, and the Z axis is set at a stroke end nearest to the ATC position out of the machining area. In this case, if any one axis of the X axis, the Y axis, and the Z axis is positioned at the ATC standby position in a state that the ATC cover is closed, any one axis of the X axis, the Y axis, and the Z axis is positioned at the stroke end. Thus, axial movement of any one axis of the X axis, the Y axis, and the Z axis is prohibited, and the prohibition display symbol 185 is displayed in the vicinity of an arrow head portion indicating a direction toward the ATC position. Thereafter, if the ATC cover is opened, the axial movement prohibition is released, and the prohibition display symbol 185 that has been displayed is erased. In this way, since the axial movement prohibition state is displayed even in a case where an interlock state changes with the opening and closing of the cover, a worker can know whether or not operating conditions are ready, without actually operating the machine tool.

Additionally, even when the axial movement has stopped on a boundary line of a barrier zone by a barrier function to be described below, axial movement in a direction toward the barrier zone is prohibited, and the prohibition display symbol 185 is displayed. By means of the display of this prohibition display symbol, a worker can know in advance that axial movement cannot be performed to an axis even if axial movement is operated, and can avoid unnecessary confusion.

Warning Display (Display of Moving Slowly)

Since the supporting member 52 or the table supporting base 54 is present in the machining area 70 and the posture thereof in the machining area 70 changes depending on an A axis position, a risk that an interference between the supporting member or the table supporting base and the spindle 47 or the machining tool 48 may occur is high. Therefore, the machine tool of the present embodiment is equipped with the barrier function. The operation panel 14 is provided with the input key group 14*c* for inputting models of respective constituent members mentioned in the examples of the tool attachment device and the workpiece attachment device as the barrier zone. In addition, the input key group 14*c* is an example of means to be input as the barrier zone, and the means is not limited to the input key group 14*c*.

The main control unit 110 is capable of executing an axial movement simulation with an internal model for a set barrier zone not only in the automatic operation modes but also in the manual operation modes, and avoiding an interference.

Figure 13:
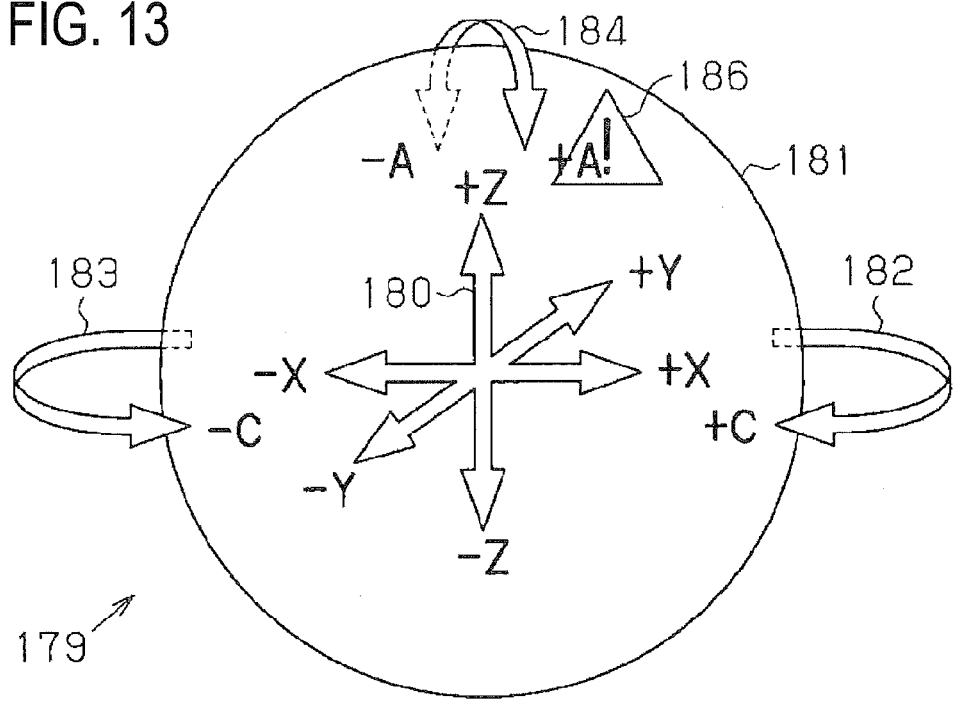
FIG. 13 is an explanatory view of a display aspect illustrating axis that is slowly moving in a case where there is a concern of interference with other members due to axial movements.

In this case, the main control unit 110 is configured so that, if the tool attachment device enters a slow-moving zone set right before the set barrier zone, the tool attachment device is reduced in speed and slowly moved and is stopped on the boundary line of the barrier zone. In addition, the slow-moving zone is set as a slow-moving distance with a parameter. If the tool attachment device rushes into this slow-moving zone, the main control unit 110 controls the movement of the tool attachment device at the lower one of a speed set by the rapid feed rate adjustment switch 167 or the jog feed rate adjustment switch 168, and a slow-moving speed in the slow-moving zone. Thus, this gives operational discomfort to a worker. In order to eliminate this discomfort, the main control unit 110 outputs a warning display showing that the tool attachment device is located in the slow-moving zone, that is, the tool attachment device is moving slowly, to the display controller 174. The display controller 174, as illustrated in FIG. 13, reads warning display symbol data from the display data memory 170, and displays the warning display symbol data in the vicinity of an arrow head portion indicating an axial movement direction. The example of FIG. 13 is an example in which, when axial movement to +A is performed, a warning display symbol 186 showing that an axis moves slowly is displayed in the vicinity of the +A.

In addition, in the above description, in the case of the machine tool in which the tool attachment device is movable, the axial movement simulation is performed with the model inside the control unit, and if the tool attachment device enters the slow-moving zone set right before the barrier zone, the tool attachment device is reduced in speed and slowly moved and is stopped on the boundary line of the barrier zone. On the contrary, in the case of a machine tool in which the workpiece attachment device is movable, the axial movement simulation may be performed with the model inside the control unit, and if the workpiece attachment device enters the slow-moving zone set right before the barrier zone, the workpiece attachment device may be slowly moved after reduction in speed and be stopped on the boundary line of the barrier zone. Additionally, in a case where both the tool attachment device and the workpiece attachment device are controllable for movement, the axial movement simulation may be performed with the model inside the control unit, and if at least one of the tool attachment device and the workpiece attachment device similarly enters the slow-moving zone set right before the barrier zone, at least one device may be slowly moved after reduction in speed and be stopped on the boundary line of the barrier zone.

Additionally, in an interlock function for the axial movement prohibition, for example, speed is reduced slightly right before a stroke end, the axial movement is stopped at the stroke end, and the interlock state of the axial movement prohibition is brought about. However, the above warning display may be performed even during the speed reduction.

(Axis Configuration Model)

In the present embodiment, the arrows indicating the directions of the axes included in the machine tool are displayed as an axis configuration model 179. Accordingly, by comparing the posture of the actual machine to the axis configuration model, the worker can intuitively understand an axis and a direction to be operated when an axial movement operation is performed in the manual operation modes.

Figure 14:
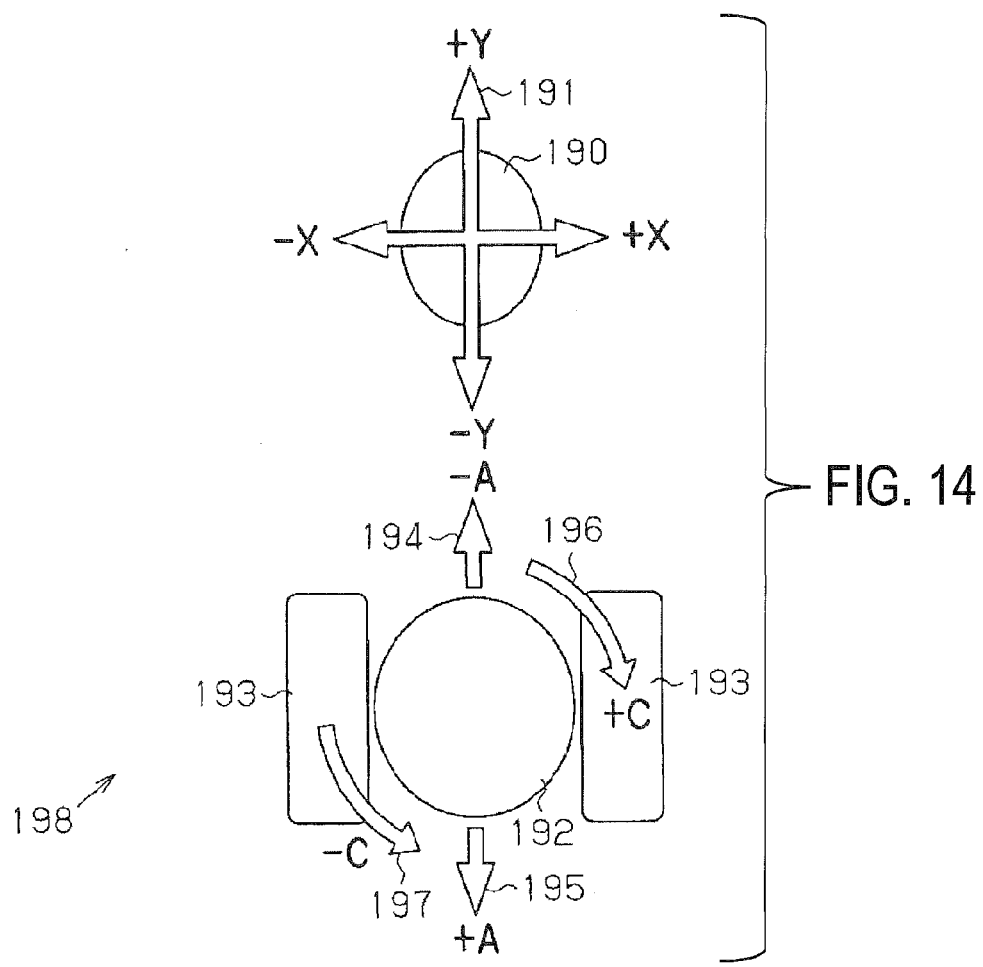
FIG. 14 is an explanatory view of a display aspect illustrating movement directions of axes when a movable portion of the machine tool is simplified and viewed in a plan view.

Additionally, instead of the axis configuration model 179 constituted of the symbol 180, the sphere 181, and the arrows 182, 183, and 184 that are illustrated in FIGS. 6 and 8, an axis configuration model 198 may be constituted of a tool spindle symbol 190, an arrow 191 indicating the movement direction of the tool spindle symbol 190 on the X axis and the Y axis, a table symbol 192, a symbol 193 for a supporting member that supports the table supporting base, and arrows 194, 195, 196, and 197 indicating the movement directions of the A axis and the C axis, in a top plan view of a machine tool as illustrated in FIG. 14. Since the symbols (the tool spindle symbol 190 and the table symbol 192) representing the movable constituent members of the machine tool are displayed and the arrows 191, 194, 195, 196, and 197 indicating the movement directions are displayed, a worker can intuitively understand which constituent member moves in which direction.

Figure 15:
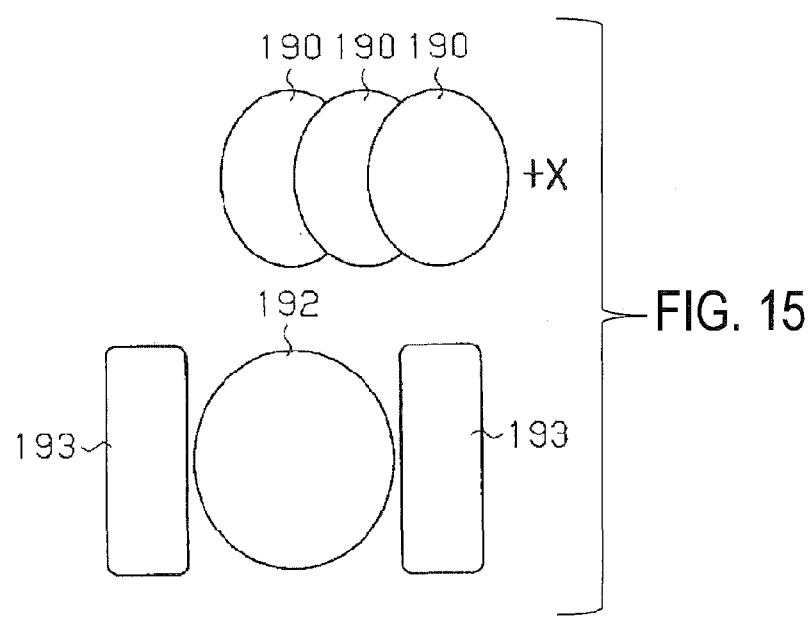
FIG. 15 is an explanatory view of a display aspect illustrating movement directions of axes by animating the movable portion, when the movable portion of the machine tool is simplified and viewed in a plan view.
Figure 16A:
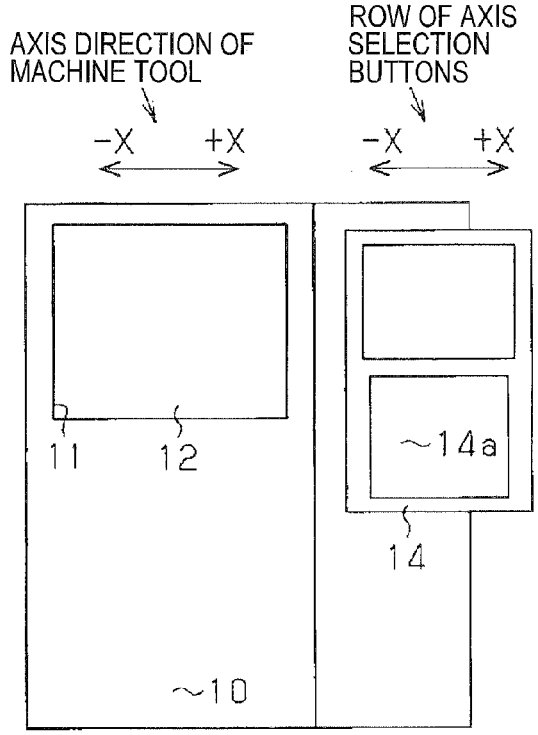
FIG. 16A is a front view around a window of the machine tool when the operation surface of the operation panel is directed to a front side.
Figure 16B:
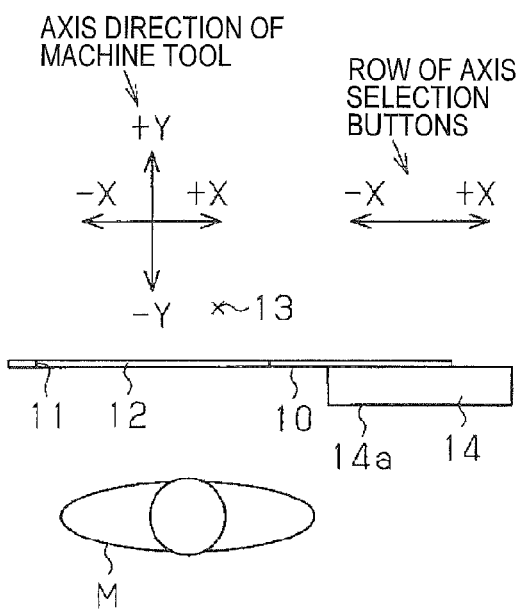
FIG. 16B is a schematic plan view around the window of the machine tool when the operation surface of the operation panel is directed to the front side.

Additionally, as illustrated in FIG. 15, the axial movement of the tool spindle or the table may display the symbol of the tool spindle or the table moving in the axial movement direction with an animation. FIG. 15 is an example in which a case where the tool spindle symbol 190 moves in the +X axis direction is illustrated with an animation. Accordingly, the axial movement direction of the tool spindle can be more intuitively understood.

In addition, the invention is not limited to the embodiment and may be performed as follows.

Although description is omitted in the above embodiment, for example, when the warning display or the prohibition display is given as mentioned above in the manual pulse modes and the manual operation modes, the display controller 174, as illustrated in FIG. 5, may display a warning display symbol 187 representing that an alarm is generated, on the display area 60*d* at a corner of the display surface 60*a*. In addition, the display area is not limited to the display area 60*d*, and may be around the display surface 60*a*. Additionally, a central portion of the display surface 60*a* may be used as the display area if the central portion does not become a hindrance when the inside of the machine is viewed. Moreover, although the display surface 60*a* has been described to have a quadrangular flat shape, the display surface 60*a* may be a quadrangular curved surface shape or may be a circular flat shape.

Although the function of assisting a worker's operation by displaying the axis configuration model has been added, additionally displaying data, such as the current position coordinates of the respective axes, selected tool numbers, tool correction data, and workpiece coordinate data makes the state of the machine or an NC device grasped even if the display device on the operation panel is not viewed, and operability is further improved.

In addition, in the above embodiment, the window 39 including the transmissive display device 60 is provided in the door 37. However, the window 39 may be provided at the splashguard 33 that covers the machining area 70. The same effects as those of the embodiment can be exhibited even in this case.

In addition, in the above embodiment, the present disclosure has been implemented in the five-axis machine tool having the tilt type rotary table. However, the invention is not limited to the tilt type rotary table. It is also possible to implement the present disclosure in other machine tools, such as other types of five-axis machine tools or three-axis or four-axis machine tools. For example, an XY table that is movable in the XY directions may be used as the table 50.

In the above embodiment, the present disclosure has been implemented in the machine tool that controls the axial movement of both the tool attachment device and the workpiece attachment device. However, it is also possible to implement the present disclosure in a machine tool that controls the axial movement of any one of the tool attachment device and the workpiece attachment device. Additionally, although the number of axes is five in the machine tool of the embodiment, the invention is not limited to this axis number.

In the above embodiment, the transmissive display device 60 has been used as the manual operation auxiliary display unit. However, a projector type display device in which a half mirror is fitted into the window 39 and an image is projected on the half mirror may be provided instead of the transmissive display device 60, and an image indicating axial movement directions may be projected, that is, displayed on the half mirror in real time in the display device. Even in this case, the worker M can simultaneously view the machining area 70 and the image via the window.

A machine tool according to the embodiment of the present invention includes a tool attachment device having a machining tool mounted thereon; a workpiece attachment device to which a workpiece to be machined by the machining tool is mounted; a control unit that controls the axial movements of either one or both of the tool attachment device and the workpiece attachment device; a mode selecting unit that performs the selecting among manual operation modes and automatic operation modes; an axis selection switch that selects a target axis for the axial movement by the control unit in the manual operation mode; a cover portion that covers a machining area for machining the workpiece by the machining tool; a window that is provided in the cover portion and allows a worker to monitor the machining area therethrough; and a manual operation auxiliary display unit that displays the directions of an axis included in the machine tool as an axis configuration model on the window, when selecting the manual operation mode is performed.

According to this configuration, the worker is able to understand the movement direction of an axis when the axis selection switch is operated, by referring to the positional relationship between respective constituent members inside the machine tool that are seen from the window, and is able to perform the operation of the axis correctly and quickly. As a result, an erroneous operation of the axis selection switch can be suppressed, and a worker's burden can be made very small. Additionally, since the operation of the axis selection switch can be correctly and quickly performed, the machining time of a first article in which manual intervention is frequently performed can be shortened.

Preferably, the machine tool further includes an axis selection button as the axis selection switch, the axis selection button specifies a target axis for the axial movement by the control unit, and outputs an axial movement command signal to the specified axis. In the machine tool with the manual operation mode in which an axial movement is performed on the basis of a signal from the axis selection button, when the axis selection button is pushed in the manual operation mode, the manual operation auxiliary display unit performs highlighting of a movement direction of an axis selected by the axis selection button in the axis configuration model, and the control unit performs the axial movement in a delayed manner from the highlighting of the movement direction of the axis by the manual operation auxiliary display unit.

According to this configuration, when the axis selection button is pushed in the manual operation mode, the axial movement is performed in a delayed manner after the highlighting of the axial movement direction is performed. For this reason, the worker can stop the operation of the axis selection switch during the delayed time, when the movement direction highlighted in the axis configuration model is not the movement direction desired.

Preferably, the axis selection button is a pushbutton switch that further outputs two different signals depending on push-in amounts other than an OFF signal. When the axis selection button is pushed in the manual operation mode, the manual operation auxiliary display unit performs highlighting of a movement direction of an axis specified by output at a shallow operation position of the axis selection button in the axis configuration model, and the control unit performs the axial movement by an output at a deep operation position of the axis selection button.

According to this configuration, when the axis selection button is operated in the manual operation mode, the movement direction of an axis is highlighted by first operating the axis selection button with a light force, and then, the axial movement is performed by operating the axis selection button with a stronger force. For this reason, the worker can avoid an erroneous operation of the axial movement such that the worker does not further push in the axis selection switch, when the movement direction of the highlighted axis is not the movement direction of a desired axis.

Preferably, the machine tool further includes an axial movement command signal generator that outputs an axial movement command signal in the manual operation mode. In the machine tool with the manual operation mode in which an axial movement on the axis selected by the axis selection switch is performed on the basis of a signal from the axial movement command signal generator, when the manual operation mode is selected, the manual operation auxiliary display unit performs highlighting of an axis selected by the axis selection switch in the axis configuration model.

According to this configuration, since an axis selected by the axis selection switch in the axis configuration model is highlighted on the window when the manual operation mode is selected, the worker can confirm the axis selected by the axis selection switch before the axial movement is operated.

Preferably, the control unit has an interlock function of prohibiting the axial movement in a specific direction when being located in a specific place, and the manual operation auxiliary display unit displays, in the axis configuration model, an axial movement prohibition state regarding the direction of an axis to which the axial movement prohibition is applied by means of the interlock function.

According to this configuration, since a message is displayed on the window that an axis to which the interlock for axial movement prohibition is applied is in the axial movement prohibition state, the worker can know that the axis to be operated by the axis selection switch is in the axial movement prohibition state, before he actually operate it.

Preferably, the machine tool further includes means for inputting respective models of the tool attachment device and the workpiece attachment device as a barrier zone, and a barrier function which performs an axial movement simulation with a model inside the control unit, performs slow movement after speed reduction in a slow-moving zone right before the barrier zone, and performs a stop at a boundary line of the barrier zone so that no interference accompanying an axial movement occurs, when at least any one of the tool attachment device and the workpiece attachment device is operated in the manual operation mode. The manual operation auxiliary display unit displays in the axis configuration model a slow-moving state regarding a direction to move slowly in which any device is located in the slow-moving zone.

According to this configuration, since the slow-moving state is displayed, the worker can perform an operation without discomfort even if movement is made not at a desired speed but at a slow-moving speed. Additionally, the worker can easily know an avoidance direction of an interference by knowing a slow-moving direction.

Preferably, the axis configuration model displays an arrow indicating the direction of the axis.

According to this configuration, since the manual operation auxiliary display unit shows the direction of the axis with the arrow, the worker can perform an operation without mistaking an axis or a direction to be moved.

Preferably, the axis configuration model includes a symbol representing a movable constituent member of the machine tool, and an arrow indicating the movement direction of the constituent member.

According to this configuration, since which constituent member moves in which direction is displayed clearly, erroneous operation in the axial movement of manual operation decreases.

Preferably, the manual operation auxiliary display unit displays the symbol with an animation to be moved toward a movement direction.

According to this configuration, since the manual operation auxiliary display unit displays the symbol with the animation to be moved toward the movement direction, it is more easily known which constituent member moves in which direction.

Obviously, numerous modifications and variations of the present invention are possible in light of the above teachings. It is therefore to be understood that within the scope of the appended claims, the present invention may be practiced otherwise than as specifically described herein.

What is claimed is:

1. A machine tool comprising:
   a tool attachment device to which a machining tool is to be mounted;
   a workpiece attachment device to which a workpiece to be machined by the machining tool is to be mounted;
   a controller configured to control movements of at least one of the tool attachment device and the workpiece attachment device with respect to a target axis;
   a mode selector configured to select a manual operation mode or an automatic operation mode;
   an axis selector to select the target axis among a plurality of axes in a case where the mode selector selects the manual operation mode;
   a machining cover to cover a machining area in which the machining tool is to machine the workpiece;
   a window provided in the machining cover to monitor the machining area through the window; and
   a manual operation auxiliary display device configured to display, in the window, directions of the plurality of axes included in the machine tool as an axis configuration model in a case where the manual operation mode is selected, wherein
   the manual operation auxiliary display device is configured to display the directions of the plurality of axes included in the machine tool as the axis configuration model in the window in the case where the manual operation mode is selected, the displayed directions being the same directions of the axes viewed through the window by an operator,
   the axis configuration model includes a plurality of symbols, and the plurality of symbols being three-dimensionally arranged, and
   the axis configuration model includes axis names and directions.

2. The machine tool according to claim 1, wherein
   the axis selector includes an axis selection button,
   the axis selection button specifies the target axis and outputs an axial movement command signal to the target axis,
   in the manual operation mode, the movements are performed based on the axial movement command signal from the axis selection button,
   in a case where the axis selection button is pushed in the manual operation mode, the manual operation auxiliary display device highlights a movement direction of the at least one of the tool attachment device and the workpiece attachment device with respect to the target axis specified by the axis selection button in the axis configuration model, and
   the controller performs the movements in a delayed manner from the highlighting of the movement direction by the manual operation auxiliary display device.

3. The machine tool according to claim 1, wherein
   the axis selector includes an axis selection button,
   the axis selection button specifies the target axis and outputs an axial movement command signal to the target axis,
   in the manual operation mode, the movements are performed based on the axial movement command signal from the axis selection button,
   the axis selection button comprises a pushbutton switch that further outputs two different signals depending on push-in amounts other than an OFF signal, and
   in a case where the axis selection button is pushed in the manual operation mode,
   the manual operation auxiliary display device highlights a movement direction of the at least one of the tool attachment device and the workpiece attachment device with respect to the target axis specified by an output at a shallow operation position of the axis selection button in the axis configuration model, and
   the controller performs the movements according to an output at a deep operation position of the axis selection button.

4. The machine tool according to claim 1, further comprising:
   an axial movement command signal generator configured to output an axial movement command signal in the manual operation mode,
   in the manual operation mode, the movements are performed based on the axial movement command signal from the axial movement command signal generator with respect to the target axis selected by the axis selector, and in a case where the manual operation mode is selected, the manual operation auxiliary display device highlights the target axis selected by the axis selector in the axis configuration model.

5. The machine tool according to claim 1, wherein
the controller has an interlock function of prohibiting a movement of the at least one of the tool attachment device and the workpiece attachment device in a specific direction in a case where the at least one of the tool attachment device and the workpiece attachment device is located in a specific place, and
the manual operation auxiliary display device displays an axial movement prohibition state regarding a direction of an axis with respect to which a movement of the at least one of the tool attachment device and the workpiece attachment device is prohibited in the axis configuration model.

6. The machine tool according to claim 1, wherein
the axis configuration model displays an arrow indicating one of the directions of the plurality of axes.

7. The machine tool according to claim 1, wherein
the axis configuration model displays a symbol representing a movable constituent member of the machine tool, and an arrow indicating a movement direction of the movable constituent member.

8. The machine tool according to claim 1, wherein
the window is provided on a front side of the machining cover.

9. The machine tool according to claim 1, further comprising an operation panel including the mode selector and the axis selector in an operation surface.

10. The machine tool according to claim 1, further comprising an operation panel including the mode selector and the axis selector in an operation surface,
the window is provided on a front side of the machining cover,
the axis selector is two-dimensionally arranged on the operation surface of the operation panel,
the operation panel is rotatably supported on the front side of the machining cover, and
the operation panel is configured to rotate at least between a first positon that is parallel to the window and a second positon that is orthogonal to the window.

11. The machine tool according to claim 1, wherein
the manual operation auxiliary display device is a transmissive display in the window that allows an operator to see through the transmissive display to view the machining area by seeing through the transmissive display.

12. The machine tool according to claim 7, wherein
the manual operation auxiliary display device displays the symbol using an animation to be moved toward the movement direction.

13. The machine tool according to claim 9, wherein
the axis selector is two-dimensionally arranged on the operation surface of the operation panel.

14. The machine tool according to claim 9, wherein
the operation panel is rotatably supported on the front side of the machining cover.

15. The machine tool according to claim 14, wherein
the operation panel is configured to rotate at least between a first positon that is parallel to the window and a second positon that is orthogonal to the window.

16. A machine tool comprising:
a tool attachment device to which a machining tool is to be mounted;
a workpiece attachment device to which a workpiece to be machined by the machining tool is to be mounted;
a controller configured to control movements of at least one of the tool attachment device and the workpiece attachment device with respect to a target axis;
a mode selector configured to select a manual operation mode or an automatic operation mode;
an axis selector to select the target axis among a plurality of axes in a case where the mode selector selects the manual operation mode;
a cover to cover a machining area in which the machining tool is to machine the workpiece;
a window provided in the cover to monitor the machining area through the window;
a manual operation auxiliary display device configured to display directions of the plurality of axes included in the machine tool as an axis configuration model in the window in a case where the manual operation mode is selected;
input device to input respective models of the tool attachment device and the workpiece attachment device as a barrier zone; and
a barrier function which performs a simulation of the movements using a model inside the controller, performs slow movement of the at least one of the tool attachment device and the workpiece attachment device after speed reduction of the at least one of the tool attachment device and the workpiece attachment device in a slow-moving zone right before the barrier zone, and performs a stop of the at least one of the tool attachment device and the workpiece attachment device at a boundary line of the barrier zone so that no interference accompanying the movements occurs, in a case where the at least one of the tool attachment device and the workpiece attachment device is operated in the manual operation mode,
the manual operation auxiliary display device displays in the axis configuration model a slow-moving state regarding a direction to move slowly in a case where the at least one of the tool attachment device and the workpiece attachment device is located in the slow-moving zone.

17. A machine tool comprising:
a tool attachment device to which a machining tool is to be mounted;
a workpiece attachment device to which a workpiece to be machined by the machining tool is to be mounted;
control means for controlling movements of at least one of the tool attachment device and the workpiece attachment device with respect to a target axis;
mode selecting means for selecting a manual operation mode or an automatic operation mode;
axis selecting means for selecting the target axis among a plurality of axes in a case where the mode selecting means selects the manual operation mode;
a machining cover to cover a machining area in which the machining tool is to machine the workpiece;
a window provided in the machining cover to monitor the machining area through the window; and
manual operation auxiliary display means for displaying in the window, directions of the plurality of axes included in the machine tool as an axis configuration model in a case where the manual operation mode is selected, wherein
the manual operation auxiliary display means is a transmissive display means in the window that allows an operator to see through the transmissive display means to view the machining area by seeing through the transmissive display means.

18. The machine tool according to claim 17, further comprising an operation panel including the mode selecting means and the axis selecting means in an operation surface,
the window is provided on a front side of the machining cover,
the axis selecting means is two-dimensionally arranged on the operation surface of the operation panel,
the operation panel is rotatably supported on the front side of the machining cover,
the operation panel is configured to rotate at least between a first positon that is parallel to the window and a second positon that is orthogonal to the window,
the manual operation auxiliary display means displays directions of the plurality of axes included in the machine tool as an axis configuration model in the window in a case where the manual operation mode is selected, the displayed directions being the same directions of the axes viewed through the window by an operator,
the axis configuration model includes a plurality of symbols, and the plurality of symbols being three-dimensionally arranged, and
the axis configuration model includes axis names and directions.

* * * * *